United States Patent
Hsu et al.

(10) Patent No.: US 11,164,321 B2
(45) Date of Patent: Nov. 2, 2021

(54) MOTION TRACKING SYSTEM AND METHOD THEREOF

(71) Applicant: Industrial Technology Research Institute, Hsinchu (TW)

(72) Inventors: Fu-Song Hsu, Changhua County (TW); Te-Mei Wang, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 266 days.

(21) Appl. No.: 16/380,904

(22) Filed: Apr. 10, 2019

(65) Prior Publication Data

US 2020/0202538 A1 Jun. 25, 2020

(30) Foreign Application Priority Data

Dec. 24, 2018 (TW) .................................. 107146753

(51) Int. Cl.
*G06T 7/20* (2017.01)
*G06T 7/246* (2017.01)
(Continued)

(52) U.S. Cl.
CPC ................ *G06T 7/246* (2017.01); *G06T 7/50* (2017.01); *G06T 7/90* (2017.01); *G06T 17/20* (2013.01); *G06T 2200/08* (2013.01)

(58) Field of Classification Search
CPC .. G06T 7/246; G06T 7/50; G06T 7/90; G06T 17/20; G06T 2200/08; G06T 2207/10028;
(Continued)

(56) References Cited

U.S. PATENT DOCUMENTS 6,256,033 B1 * 7/2001 Nguyen .................. G06F 3/017
345/156
6,384,819 B1 * 5/2002 Hunter ............... G06K 9/00335
345/418

(Continued)

FOREIGN PATENT DOCUMENTS

CN 100517268 C 7/2009
CN 105068648 A 11/2015
(Continued)

OTHER PUBLICATIONS

Wu et al., Human pose estimation method based on single depth image, IET Computer Vision Publication, (pp. 919-924) (Year: 2018).*

(Continued)

*Primary Examiner* — Manav Seth

(57) ABSTRACT

A motion tracking system includes a first image-capturing module, a computing module and a database. The first image-capturing module captures the full body motion of an object to obtain a depth image. The database provides a plurality of training samples, wherein the training samples include a plurality of depth feature information related to joint positions of the object. The computing module receives the depth image, performs an association operation and a prediction operation for the depth image to obtain a plurality of first joint positions of the object. The computing module projects the first joint positions to a three-dimensional space to generate a three-dimensional skeleton of the object. The depth image includes an image in which limbs of the object are not occluded or an image in which some of limbs of the object are not occluded and the others of limbs of the object are occluded.

20 Claims, 10 Drawing Sheets

(51) Int. Cl.
*G06T 7/50* (2017.01)
*G06T 17/20* (2006.01)
*G06T 7/90* (2017.01)

(58) Field of Classification Search
CPC . G06T 19/00; G06T 2207/20081; G06T 7/70; G06T 2207/30221; G06T 7/20; G06T 7/75; G06T 2219/2004; G06T 13/20; G06T 15/08; G06T 19/003; G06T 15/00; G06T 2207/20044; G06T 7/292
See application file for complete search history.

(56) References Cited

U.S. PATENT DOCUMENTS

| | | | | |
|---|---|---|---|---|
| 7,003,134 B1* | 2/2006 | Covell | | G06K 9/00369 |
| | | | | 382/103 |
| 7,161,600 B2* | 1/2007 | Sasaki | | G06T 13/20 |
| | | | | 345/420 |
| 7,317,836 B2* | 1/2008 | Fujimura | | G06K 9/00362 |
| | | | | 382/154 |
| 7,590,262 B2* | 9/2009 | Fujimura | | G06K 9/00369 |
| | | | | 382/103 |
| 7,620,202 B2* | 11/2009 | Fujimura | | G06K 9/6214 |
| | | | | 382/103 |
| 7,728,839 B2* | 6/2010 | Yang | | A61B 5/1038 |
| | | | | 345/474 |
| 7,746,345 B2* | 6/2010 | Hunter | | G06T 13/40 |
| | | | | 345/473 |
| 7,760,182 B2* | 7/2010 | Ahmad | | G06Q 30/0643 |
| | | | | 345/156 |
| 7,961,174 B1* | 6/2011 | Markovic | | A63F 13/06 |
| | | | | 345/158 |
| 8,437,506 B2* | 5/2013 | Williams | | G06F 3/011 |
| | | | | 382/103 |
| 8,503,720 B2* | 8/2013 | Shotton | | G06F 3/017 |
| | | | | 382/103 |
| 8,571,263 B2* | 10/2013 | Shotton | | G06F 3/017 |
| | | | | 382/103 |
| 8,576,276 B2* | 11/2013 | Bar-Zeev | | G06T 19/006 |
| | | | | 348/53 |
| 8,633,890 B2* | 1/2014 | Tossell | | G06F 3/017 |
| | | | | 345/156 |
| 8,766,977 B2* | 7/2014 | Kim | | G06T 13/40 |
| | | | | 345/420 |
| 8,786,680 B2* | 7/2014 | Shiratori | | G06F 3/011 |
| | | | | 348/47 |
| 8,830,236 B2* | 9/2014 | Germann | | G06K 9/00201 |
| | | | | 345/420 |
| 8,953,844 B2* | 2/2015 | Williams | | G06T 7/251 |
| | | | | 382/103 |
| 9,002,099 B2* | 4/2015 | Litvak | | G06K 9/00201 |
| | | | | 382/154 |
| 9,041,622 B2* | 5/2015 | McCulloch | | G06F 3/013 |
| | | | | 345/7 |
| 9,123,316 B2* | 9/2015 | Flaks | | G06F 3/011 |
| 9,183,676 B2* | 11/2015 | McCulloch | | G06T 19/006 |
| 9,262,673 B2* | 2/2016 | Shotton | | G06F 3/017 |
| 9,358,456 B1* | 6/2016 | Challinor | | A63F 13/428 |
| 9,373,087 B2* | 6/2016 | Nowozin | | G06N 20/00 |
| 9,378,559 B2* | 6/2016 | Lee | | G06T 7/20 |
| 9,489,639 B2* | 11/2016 | Shotton | | G06N 7/005 |
| 9,626,878 B2* | 4/2017 | Rekimoto | | G09B 19/00 |
| 9,700,242 B2* | 7/2017 | Utsunomiya | | A61B 5/1127 |
| 9,949,697 B2* | 4/2018 | Iscoe | | G06T 7/143 |
| 10,019,629 B2* | 7/2018 | Lan | | G06N 3/0454 |
| 10,088,971 B2* | 10/2018 | Bastien | | G06F 3/005 |
| 10,165,949 B2* | 1/2019 | Tzvieli | | A61B 5/7282 |
| 10,210,382 B2* | 2/2019 | Shotton | | G06F 3/017 |
| 10,210,737 B2* | 2/2019 | Zhao | | G06F 1/1694 |
| 10,296,102 B1* | 5/2019 | Misra | | G06K 9/2054 |
| 10,368,784 B2* | 8/2019 | Marlow | | G06F 3/011 |
| 10,380,759 B2* | 8/2019 | Shiozaki | | G06T 7/75 |
| 10,410,359 B2* | 9/2019 | Marks | | G06T 7/251 |
| 10,417,575 B2* | 9/2019 | Nowozin | | G06N 20/20 |
| 10,529,137 B1* | 1/2020 | Black | | G06N 3/08 |
| 10,573,050 B1* | 2/2020 | Liu | | G06T 13/40 |
| 10,607,403 B2* | 3/2020 | Neulander | | G06T 19/006 |
| 10,657,367 B2* | 5/2020 | Fei | | G02B 27/017 |
| 10,679,046 B1* | 6/2020 | Black | | G06T 17/00 |
| 10,685,454 B2* | 6/2020 | Kim | | G06T 7/579 |
| 10,713,850 B2* | 7/2020 | Ni | | G06T 17/00 |
| 10,796,482 B2* | 10/2020 | Ge | | G06K 9/6256 |
| 10,839,586 B1* | 11/2020 | Nemchinov | | G06T 3/0037 |
| 11,009,941 B2* | 5/2021 | Erivantcev | | G06T 7/97 |
| 11,016,116 B2* | 5/2021 | Erivantcev | | G06F 1/163 |
| 2004/0155962 A1* | 8/2004 | Marks | | G06T 7/50 |
| | | | | 348/169 |
| 2007/0103471 A1* | 5/2007 | Yang | | G06T 7/246 |
| | | | | 345/473 |
| 2008/0152191 A1* | 6/2008 | Fujimura | | G06K 9/00214 |
| | | | | 382/103 |
| 2009/0110292 A1* | 4/2009 | Fujimura | | G06F 3/017 |
| | | | | 382/203 |
| 2009/0232353 A1* | 9/2009 | Sundaresan | | G06K 9/00342 |
| | | | | 382/103 |
| 2010/0111370 A1* | 5/2010 | Black | | G06K 9/00369 |
| | | | | 382/111 |
| 2010/0134490 A1* | 6/2010 | Corazza | | G06T 13/40 |
| | | | | 345/420 |
| 2010/0191124 A1* | 7/2010 | Prokoski | | G01K 13/20 |
| | | | | 600/473 |
| 2010/0238168 A1* | 9/2010 | Kim | | G06T 17/00 |
| | | | | 345/420 |
| 2010/0271368 A1* | 10/2010 | McNamara | | G06T 17/00 |
| | | | | 345/420 |
| 2011/0069866 A1* | 3/2011 | Kim | | G06T 7/174 |
| | | | | 382/103 |
| 2011/0292036 A1* | 12/2011 | Sali | | G06T 17/00 |
| | | | | 345/419 |
| 2012/0019517 A1* | 1/2012 | Corazza | | G06T 17/20 |
| | | | | 345/419 |
| 2012/0299912 A1* | 11/2012 | Kapur | | G06F 3/017 |
| | | | | 345/419 |
| 2013/0097194 A1* | 4/2013 | Braga | | G06F 16/5838 |
| | | | | 707/758 |
| 2013/0204436 A1* | 8/2013 | Kim | | B25J 9/16 |
| | | | | 700/259 |
| 2013/0266174 A1* | 10/2013 | Bleiweiss | | G06K 9/00355 |
| | | | | 382/103 |
| 2015/0139505 A1* | 5/2015 | Vladimirov | | G06T 7/246 |
| | | | | 382/107 |
| 2015/0310629 A1* | 10/2015 | Utsunomiya | | G06K 9/00348 |
| | | | | 382/107 |
| 2015/0356767 A1* | 12/2015 | Suma | | G06T 13/40 |
| | | | | 345/419 |
| 2016/0027188 A1* | 1/2016 | Marks | | G06T 7/248 |
| | | | | 348/169 |
| 2016/0033768 A1 | 2/2016 | Pedrotti et al. | | |
| 2016/0042227 A1* | 2/2016 | Zhong | | G06K 9/00342 |
| | | | | 382/103 |
| 2016/0260251 A1 | 9/2016 | Stafford et al. | | |
| 2016/0378176 A1 | 12/2016 | Shiu et al. | | |
| 2016/0381328 A1* | 12/2016 | Zhao | | G06F 1/1694 |
| | | | | 348/154 |
| 2017/0316578 A1* | 11/2017 | Fua | | G06T 7/246 |
| 2018/0174307 A1* | 6/2018 | Nonaka | | G06T 7/97 |
| 2018/0225858 A1* | 8/2018 | Ni | | G06T 17/20 |
| 2019/0220657 A1* | 7/2019 | Yabuki | | G06K 9/00751 |
| 2019/0266425 A1* | 8/2019 | Iwai | | G06T 7/73 |
| 2020/0042782 A1* | 2/2020 | Masui | | G06K 9/6256 |
| 2020/0388052 A1* | 12/2020 | Fukasawa | | A63F 13/428 |

FOREIGN PATENT DOCUMENTS

| | | |
|---|---|---|
| CN | 205015835 U | 2/2016 |
| TW | 201143866 A | 12/2011 |
| TW | 201215435 A | 4/2012 |
| TW | 201228380 A | 7/2012 |

(56) References Cited

FOREIGN PATENT DOCUMENTS

| TW | 201612692 A | 4/2016 |
|---|---|---|
| WO | WO 2016095057 A1 | 6/2016 |
| WO | WO 2017139871 A1 | 8/2017 |

OTHER PUBLICATIONS

Rhodin et al., "EgoCap: Egocentric Marker-less Motion Capture with Two Fisheye Cameras", (pp. 162:1-162:11) (Year: 2016).*
Cha et al., "Towards Fully Mobile 3D Face, Body, and Environment Capture Using Only Head-worn Cameras" (pp. 2993-3004) (Year: 2018).*
Taiwan Patent Office, Office Action, Patent Application Serial No. 107146753, dated Aug. 27, 2019, Taiwan.
Xu et al., "Mo2Cap2: Real-time Mobile 3D Motion Capture with a Cap-mounted Fisheye Camera," Mar. 2018, 18 pages, IEEE, US.
Insafutdinov et al., "ArtTrack: Articulated Multi-person Tracking in the Wild," 2017, pp. 6457-6465, IEEE, US.
He et al., "Mask R-CNN," 2017, pp. 2961-2969, IEEE, US.
Rhodin et al., "EgoCap: Egocentric Marker-less Motion Capture with Two Fisheye Cameras," SIGGRAPH Asia 2016 Technical Papers, Dec. 2016, 11 pages, ACM, US.
Insafutdinov et al., "DeeperCut: A Deeper, Stronger, and Faster Multi-Person Pose Estimation Model," 2016, 1 page, MPII, US.

* cited by examiner

MOTION TRACKING SYSTEM AND METHOD THEREOF

CROSS-REFERENCE TO RELATED APPLICATION

The present application is based on, and claims priority from, Taiwan Application Serial Number 107146753, filed Dec. 24, 2018, the disclosure of which is hereby incorporated by reference herein in its entirety.

TECHNICAL FIELD

The present disclosure relates to a motion tracking system and a method thereof.

BACKGROUND

Full body tracking technology is widely used in different fields, such as the film industry, the video game industry, sports, rehabilitation, human-computer interaction, etc. At present, the main provider of virtual reality (VR) interactive technology only provides the detection of two-handed motion, and does not provide detection of the body motion and lower limb motion.

Since the existing full body motion tracking technology could not be directly applied to a head-mounted VR helmet, VR interaction is mainly based on the head-mounted motion controller for the current full body motion detection. That is, the user needs to hold the motion controller or mount the motion controller on the body, so as to achieve the detection and the tracking of the full body motion. This is inconvenient. Accordingly, designs for full body motion tracking need improvement.

SUMMARY

The present disclosure provides a motion tracking system, which includes a first image-capturing module, a database and a computing module. The first image-capturing module captures the full body motion of an object to obtain a depth image. The database provides a plurality of training samples, wherein the training samples include a plurality of depth feature information related to joint positions of the object. The computing module receives the depth image, performs an association operation and a prediction operation for the depth image according to the depth image and the depth feature information of the training samples to obtain a plurality of first joint positions of the object, and projects the first joint positions to a three-dimensional space to generate a three-dimensional skeleton of the object. The depth image includes an image in which limbs of the object are not occluded or an image in which some of limbs of the object are not occluded and the others of limbs of the object are occluded.

The present disclosure provides a motion tracking method, which includes the following steps. The full body motion of an object is captured to obtain a depth image. A plurality of training samples are provided, wherein the training samples include a plurality of depth feature information related to joint positions of the object. The depth image is received. An association operation and a prediction operation are performed for the depth image according to the depth image and the depth feature information of the training samples to obtain a plurality of first joint positions of the object, wherein the depth image includes an image in which limbs of the object are not occluded or an image in which some of limbs of the object are not occluded and the others of limbs of the object are occluded. The first joint positions are projected to a three-dimensional space. A three-dimensional skeleton of the object is generated.

BRIEF DESCRIPTION OF DRAWINGS

The present disclosure could be more fully understood by reading the subsequent detailed description and examples with references made to the accompanying drawings, wherein.

DETAILED DESCRIPTION OF DISCLOSED EMBODIMENTS

Technical terms of the disclosure are based on general definition in the technical field of the disclosure. If the disclosure describes or explains one or some terms, definition of the terms is based on the description or explanation of the disclosure. Each of the disclosed embodiments has one or more technical features. In possible implementation, a person skilled in the art would selectively implement all or some technical features of any embodiment of the disclosure or selectively combine all or some technical features of the embodiments of the disclosure.

In each of the following embodiments, the same reference number represents the same or similar element or component.

Figure 1A:
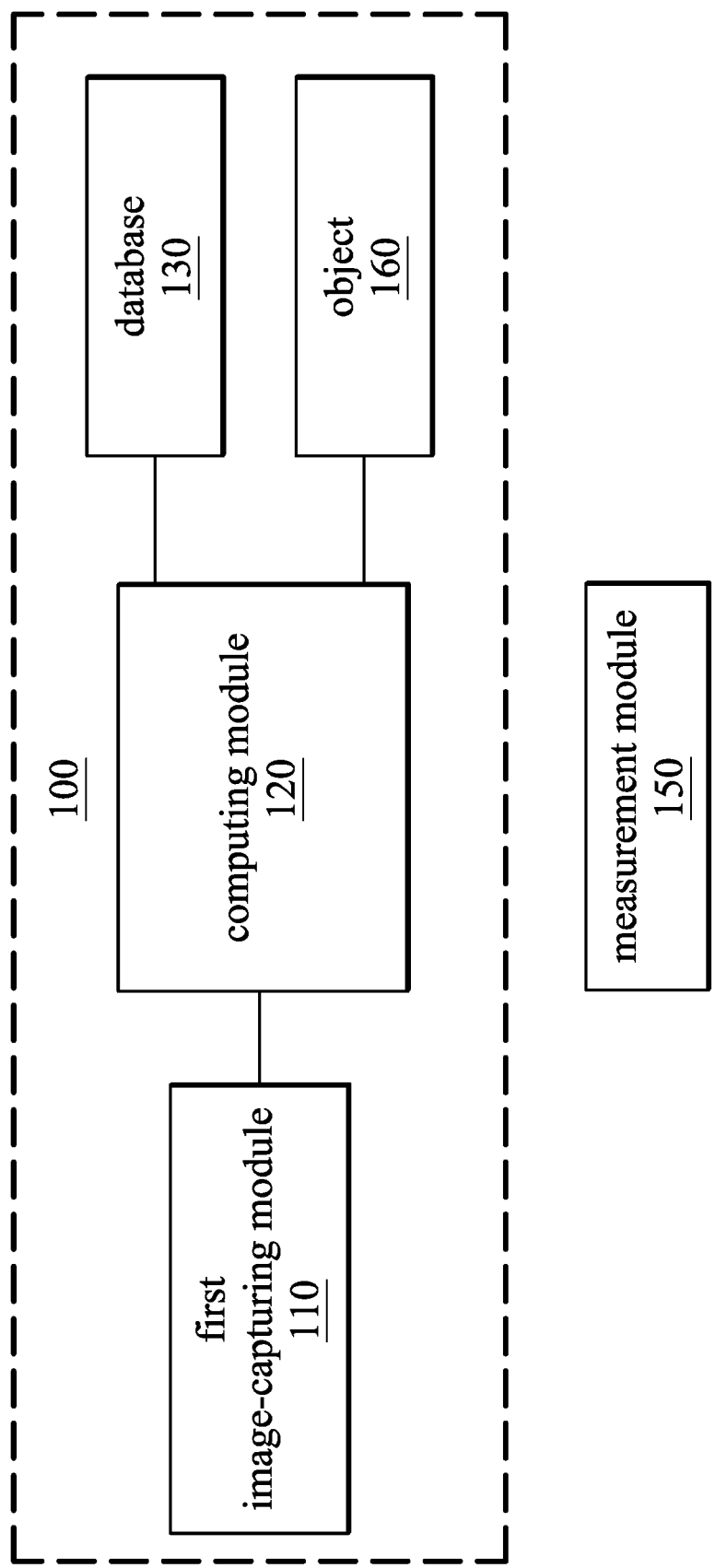
FIG. 1A is a schematic view of a motion tracking system according to an embodiment of the present disclosure.

FIG. 1A is a schematic view of a motion tracking system according to an embodiment of the present disclosure. The motion tracking system 100 of the embodiment is suitable for virtual and augmented reality. Please refer to FIG. 1A, the motion tracking system 100 includes a first image-capturing module 110, a computing module 120 and a database 130.

The first image-capturing module 110 captures the full body motion of an object 150 to obtain a depth image. In the embodiment, the first image-capturing module 110 is, for example, a depth camera and the depth camera may also be a wide-angle depth camera. For example, a viewing angle of the first image-capturing module 110 may be 90 degrees, 180 degrees, 270 degrees, 360 degrees or 720 degrees, but not intended to limit the present disclosure. In addition, the above object 150 is, for example, a user, an animal, a robot or other objects with joint parts.

The database 130 may be a storage device, such as a memory, a hard disk, etc. The database 130 may provide a plurality of training samples and the training samples may include a plurality of depth feature information related to joint positions of the object 150. In the embodiment, the training samples described above may be set by the user in advance. For example, a motion capture system with cameras is configured in a surrounding environment of the object or the user. These cameras capture the motions of the limbs of the object 150 or the user. The computing module 120 analyzes images with various viewing angles captured by the cameras mentioned above to obtain a three-dimensional skeleton of the object 150 or the user. Simultaneously, the motion tracking system 100 may also be mounted on the object 150 or the user, and the first image-capturing module 110 captures the full body motion of the object 150 or the user to obtain a depth image.

The computing module 120 obtains the depth image captured by the first image-capturing module 110, and associates the three-dimensional skeleton of the object 150 or the user with the depth image, so as to calculate depth features of the joint positions of the object 150 or the user. The computing module 120 designates the depth feature information corresponding each motion as different training samples and stores the training sample above in the database 130. In addition, the training samples above include the depth feature information corresponding to the image in which the limbs of the object 150 or the user are not occluded or the depth feature information corresponding to the image in which some of limbs of the object 150 or the user are not occluded and the others of limbs of the object 150 or the user are occluded.

In the embodiment, when the limbs of the object 150 or the user are not occluded, it indicates that the limbs of full body of the object 150 or the user are not occluded. When some of limbs of the object 150 or the user are not occluded and the others of the limbs of the object 150 or the user are occluded, it indicates that some of limbs of the object 150 or the user are occluded by the other limbs. For example, a first limb (such as the foot) of the object 150 or the user is occluded by a second limb (such as the arm) of the object 150 or the user. Alternatively, the first limb (such as the body torso and the foot) of the object 150 or the user is occluded by the second limb (such as the arm) of the object 150 or the user. The distance between the first limb and the first image-capturing module 110 is farther than the distance between the second limb and the first image-capturing module 110.

The computing module 120 is coupled to the first image-capturing module 110 and database 130 and receives the depth image obtained by the first image-capturing module 110. The computing module 120 performs an association operation and a prediction operation for the depth image according to the depth image and the depth feature information of the training samples of the database 130 to obtain a plurality of first joint positions of the object. The depth image above includes an image in which the limbs of the object 150 are not occluded or an image in which some of limbs of the object 150 are not occluded and the others of limbs of the object 150 are occluded.

In the embodiment, the computing module 120 may be a processor or a micro-controller. In addition, the computing module 120 may also be a chip, a circuit, a circuit board, or a record medium for storing a number of program codes.

In the embodiment, the computing module 120 uses a processing operation, such as deep neural network (DNN) or artificial intelligence (AI), to perform the association operation and the prediction operation for the depth image and the depth feature information of the training samples, so as to determine joint positions corresponding to the object 150 in the depth image and obtain the first joint positions of the object 150. The deep neural network (DNN) is, for example, ResNet or other similar neural networks.

For example, when the depth image includes an image in which the limbs of the object 150 are not occluded, the computing module 120 may obtain the depth feature information corresponding to the depth image (i.e., the image in which the limbs of the object 150 are not occluded) from the database 130. That is, the computing module 120 obtains the depth feature information of the training sample that is most similar to the depth image. The depth feature information above includes information related to limbs of the full body of the object 150 when the limbs of the full body of the object 150 are not occluded. Then, the computing module 120 performs the association operation and the prediction operation for the depth feature information and the depth image to determine the joint positions of the object 150 in the depth image and obtain the first joint positions of the object 150.

When some of limbs of the object 150 are not occluded and the others of limbs of the object 150 are occluded, the computing module 120 may obtain the depth feature information corresponding to the depth image (i.e., the image in which some of limbs of the object 150 are not occluded and the others of limbs of the object 150 are occluded) from the database 130. That is, the computing module 120 obtains the depth feature information of the training sample that is most similar to the depth image. The depth feature information above includes information related to limbs of the full body of the object 150 when some of limbs of the object 150 are not occluded and the others of limbs of the object 150 are occluded. Then, the computing module 120 may perform the association operation and the prediction operation for depth image according to the joint positions recorded in the depth feature information to determine the joint positions of the object 150 in the depth image and obtain the first joint positions of the object 150.

If the object 150 is exemplified by a user, the first joint positions of the object 150 may include joint positions of the user, such as hand, arm, hip, knee, ankle, finger, etc. In the embodiment, when the limbs of the object 150 are not occluded, it indicates that the limbs of full body of the object 150 are not occluded. When some of limbs of the object 150 are not occluded and the others of limbs of the object 150 are occluded, it indicates that some of limbs of the object 150 are occluded by the other limbs. For example, a first limb (such as the foot) of the object 150 is occluded by a second limb (such as the arm) of the object 150. Alternatively, the first limb (such as the body torso and the foot) of the object 150 is occluded by the second limb (such as the arm) of the object 150. The distance between the first limb and the first image-capturing module 110 is farther than the distance between the second limb and the first image-capturing module 110.

The computing module 120 projects the first joint positions to a three-dimensional space to generate a three-dimensional skeleton of the object 150. That is, after the computing module 120 obtains the first joint positions of the object 150, the computing module 120 projects the first joint positions to the three-dimensional space. The computing module 120 connects the first joint positions (such as the "dot" shown in FIG. 1B) according to a corresponding relationship between the first joint positions to generate the three-dimensional skeleton of the object 150, such as "dot plus connection" shown in FIG. 1B. The three-dimensional skeleton of the object 150 in FIG. 1B includes hand, arm, hip, knee, ankle, finger and so on of the user. Therefore, the three-dimensional skeleton of the object 150 is accurately obtained to track the full body motions of the object 150 and increase the convenience of use.

Figure 1B:
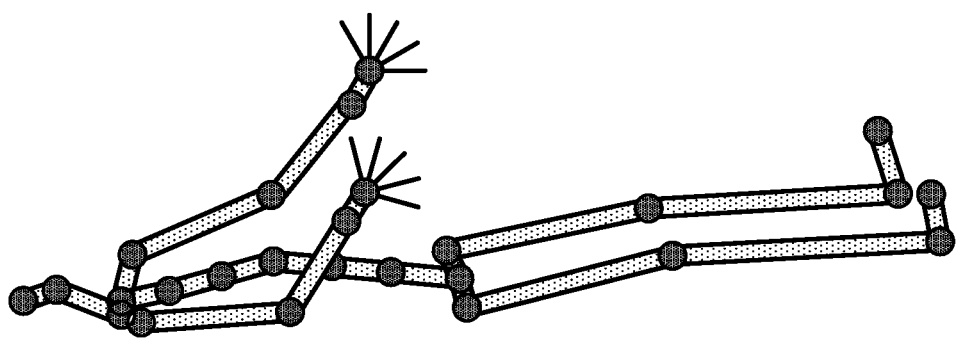
FIG. 1B is a schematic view of a three-dimensional skeleton of an object according to an embodiment of the present disclosure.
Figure 1C:
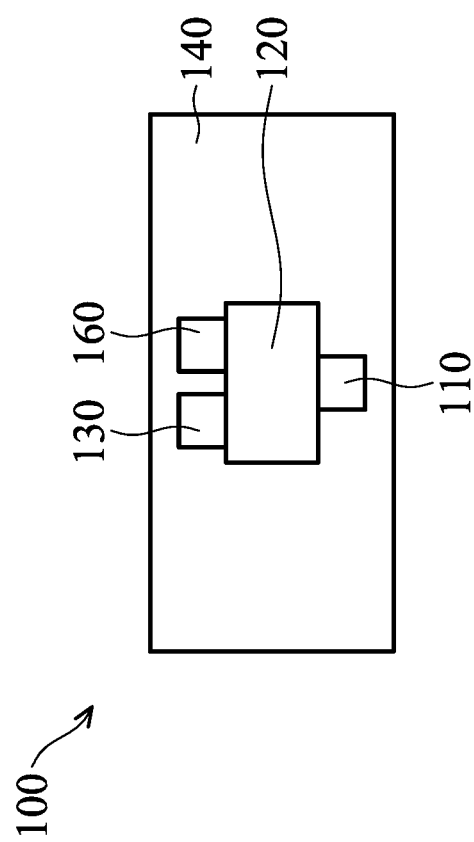
FIG. 1C is a schematic view of an arrangement relationship of a first image-capturing module, a computing module and a head-mounted device in FIG. 1A.

In the embodiment, the motion tracking system 100 further includes a head-mounted device 140, and the first image-capturing module 110 and the computing module 120 may be mounted on the head-mounted device 140, as shown in FIG. 1C. Therefore, the head-mounted device 140 may be mounted on the object 150 to sense the motions of the limbs of the object 150 and effectively generate the three-dimensional skeleton of the object 150.

In one embodiment, the first image-capturing module 110 may be mounted inside a case of the head-mounted device 140 to capture the full body motion of the object 150. The computing module 120 and the database 130 may be mounted inside the case of the head-mounted device 140 to compute the depth image obtained by the first image-capturing module 110.

In another embodiment, the first image-capturing module 110 may be mounted outside the case of the head-mounted device 140 to capture the object 150 and obtain the depth image corresponding the full body motion of the object 150. Furthermore, the first image-capturing module 110 may be mounted on the bottom, the center or the top outside the case of the head-mounted device 140.

In the embodiment, when the head-mounted device 140 is mounted on a head of the object 150, the first image-capturing module 110 has a viewing angle with a top-town view, so that a limb (such as the lower limb of the object 150) of the object 150 of the depth image in which is away from the first image-capturing module 110 is easily occluded by the arm of the object 150 to cause arm-leg self-occlusions. Since the three-dimensional skeleton corresponding to the limb of the object 150 that is occluded is already stored in the database 130, the computing module 120 is not affected by the depth image including the limb of the object 150 that is occluded.

When the depth image includes an image in which some of limbs of the object 150 are not occluded and the others of limbs of the object 150 are occluded, the computing module 120 may still obtain the depth feature information of the training sample that is most similar to the depth image from the database 130. The computing module 120 performs the association operation and the prediction operation for the limbs of the object 150 according to the depth feature information to determine the joint positions of the object 150 in the depth image, so that the computing module 120 may accurately generate the three-dimensional skeleton. That is, in the situation that the arm often occludes the body torso or lower limbs from the viewing angle of the head-mounted device 140, the computing module 120 may still predict the joint positions of the body torso or lower limbs to accurately generate the three-dimensional skeleton.

In addition, in the embodiment, the computing module 120 may take the head-mounted device 140 (i.e., the motion tracking system 100) as an origin point, and calculate a relative position and a relative direction of the limb of the object 150 to the head-mounted device 140 and a motion direction and an acceleration of the limb of the object 150 according to the depth image obtained by the first image-capturing module 110. Then, the computing module 120 projects a virtual limb image (i.e., the three-dimensional skeleton) corresponding to the object 150 to a virtual environment. The virtual limb presented by the virtual environment is consistent with the real motion of the object 150.

Furthermore, since the viewing angle of the first image-capturing module 110 may be 180 degrees or 360 degrees, so that the limb of the object 150 is too close to the head-mounted device 140, the first image-capturing module 110 may still capture the full body motion of the object 150 from the head-mounted device 140. With the movement of the object 150 and the head-mounted device 140, the background environment is also constantly changing. According to the depth image corresponding to the object 150 obtained by the first image-capturing module 110, the motion tracking system 100 may effectively distinguish the motion of the object 150 and the background environment. Therefore, the motion tracking system 100 may accurately generate the three-dimensional skeleton and is not affected by a change in the background environment.

In addition, according to the depth image corresponding to the object 150 obtained by the first image-capturing module 110, the motion tracking system 100 may also effectively identify the limbs (such as the ankle and the foot) of the object 150. Therefore, the motion tracking system 100 may accurately generate the three-dimensional skeleton including the ankle and the foot. In the embodiment, the ankle and the foot are farther from the head-mounted device 140.

Furthermore, the motion tracking system 100 may include a measurement module 160. In the embodiment, the measurement module 160 may be an inertial measurement unit (IMU). The measurement module 160 is connected to the computing module 120, and measures and calculates a position, a motion direction and the motion speed of the head of the object 150 to generate a head posture. Then, the computing module 120 further associates the head posture and the first joint positions according to the head posture, and projects the first joint positions and the head posture to the three-dimensional space to generate the three-dimensional skeleton of the object 150. That is, the three-dimensional skeleton generated by the computing module 120 includes the limbs (such as the hand, the foot, etc.) of the object 150 and also includes the head of the object 150. In addition, the measurement module 160 may be mounted inside the case of the head-mounted device 140.

Figure 2A:
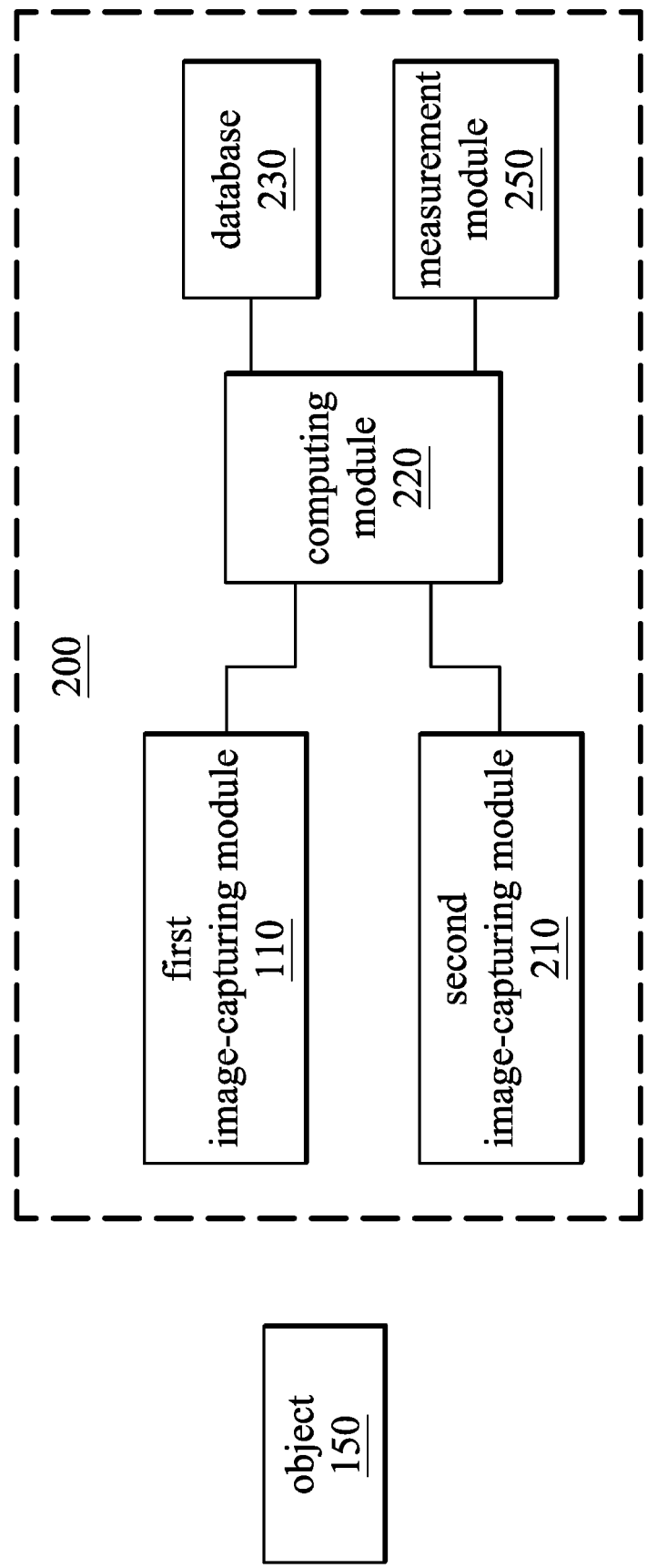
FIG. 2A is a schematic view of a motion tracking system according to another embodiment of the present disclosure.

FIG. 2A is a schematic view of a motion tracking system according to another embodiment of the present disclosure. The motion tracking system 200 of the embodiment is suitable for virtual and augmented reality. Please refer to FIG. 2A, the motion tracking system 200 includes a first image-capturing module 110, a second image-capturing module 210, a computing module 220 and a database 230. The first image-capturing module 110 and the object 150 of the embodiment are equal to or similar to the first image-capturing module 110 and the object 150 in FIG. 1A, and the description thereof will be the same as that of the embodiment in FIG. 1A, and it is not repeated herein.

The second image-capturing module 210 captures the full body motion of an object 150 to obtain a global image. In the embodiment, the second image-capturing module 210 is, for example, a color fisheye camera, a monochrome fisheye camera or an infrared fisheye camera. For example, a viewing angle of the second image-capturing module 210 may be 180 degrees or more, so as to capture the full body motion of the object 150. Furthermore, the viewing angle of the second image-capturing module 210 may also be 270 degrees or 360 degrees or 720 degrees.

The database 230 may be a storage device, such as a memory, a hard disk, etc. The database 230 may provide a plurality of training samples and the training samples may include a plurality of depth feature information related to joint positions of the object 150 and a plurality of color feature information related to joint positions of the object 150. In the embodiment, the training samples above may be set by the user in advance. The description of the embodiment in FIG. 1A may be referred to for the setting manner of the depth feature information of the training samples, and the description thereof is not repeated herein.

In addition, the motion capture system with cameras is configured in the surrounding environment of the object or the user. These cameras configured in the surrounding environment capture the motions of the limbs of the object 150 or the user. The computing module 220 analyzes images with various viewing angles captured by the cameras above to obtain the three-dimensional skeleton of the object 150 or the user. Simultaneously, the motion tracking system 200 may also be mounted on the object 150 or the user, and the second image-capturing module 210 captures the full body motion of the object 150 or the user to obtain the global image. Then, the computing module 220 obtains the global image captured by the second image-capturing module 210, and associates the three-dimensional skeleton of the object 150 or the user with the global image, so as to calculate color features of the joint positions of the object 150 or the user. The computing module 220 designates the color feature information corresponding to each motion as different training samples and stores the training sample mentioned above in the database 130. In addition, the training samples above include the color feature information corresponding to the image in which the limbs of the object 150 or the user are not occluded or the color feature information corresponding to the image in which some of limbs of the object 150 or the user are not occluded and the others of limbs of the object 150 or the user are occluded.

In the embodiment, when the limbs of the object 150 or the user are not occluded, it indicates that the limbs of full body of the object 150 or the user are not occluded. When some of limbs of the object 150 or the user are not occluded and the others of limbs of the object 150 or the user are occluded, it indicates that some of limbs of the object 150 or the user are occluded by the other limbs. For example, a first limb (such as the foot) of the object 150 or the user is occluded by a second limb (such as the arm) of the object 150 or the user. Alternatively, the first limb (such as the body torso and the foot) of the object 150 or the user is occluded by the second limb (such as the arm) of the object 150 or the user. The distance between the first limb and the second image-capturing module 210 is farther than the distance between the second limb and the second image-capturing module 210.

The computing module 220 is coupled to the first image-capturing module 110, the second image-capturing module 210 and database 230, and receives the depth image obtained by the first image-capturing module 110 and the global image obtained by the second image-capturing module 210. In the embodiment, the computing module 220 may be a processor or a micro-controller. In addition, the computing module 220 may also be a chip, a circuit, a circuit board, or a record medium for storing a number of program codes. Then, the computing module 220 performs an association operation and a prediction operation for the depth image and the global image according to the depth image, the global image and the depth feature information and the color feature information of the training samples of the database 230 to obtain a plurality of first joint positions of the object 150 and a plurality of second joint positions of the object 150. The depth image above includes an image in which limbs of the object 150 are not occluded or an image in which some of limbs of the object 150 are not occluded and the others of limbs of the object 150 are occluded. The global image described above includes an image in which limbs of the object 150 are not occluded or an image in which some of limbs of the object 150 are not occluded and the others of limbs of the object 150 are occluded.

In the embodiment, the computing module 220 uses a processing manner, such as deep neural network or artificial intelligence, to perform the association operation and the prediction operation for the depth image and the depth feature information of the training samples and for the global image and the color feature information of the training samples, so as to determine joint positions corresponding to the object 150 in the depth image and the global image and obtain the first joint positions and the second joint positions of the object 150. The deep neural network is, for example, ResNet or other similar neural networks.

For example, when the depth image includes an image in which the limbs of the object 150 are not occluded, the computing module 220 may obtain the depth feature information corresponding to the depth image (i.e., the image in which the limbs of the object 150 are not occluded) from the database 230. That is, the computing module 220 obtains the depth feature information of the training sample that is most similar to the depth image. The depth feature information above includes information related to limbs of the full body of the object 150 when the limbs of the full body of the object 150 are not occluded. Then, the computing module 220 performs the association operation and the prediction operation for the depth feature information and the depth image to determine the joint positions of the object 150 in the depth image and obtain the first joint positions of the object 150.

When some of limbs of the object 150 are not occluded and the others of limbs of the object 150 are occluded, the computing module 220 may obtain the depth feature information corresponding to the depth image (i.e., the image in which some of limbs of the object 150 are not occluded and the others of limbs of the object 150 are occluded) from the database 230. That is, the computing module 220 obtains the depth feature information of the training sample that is most similar to the depth image. The depth feature information above includes information related to limbs of the full body of the object 150 when some of limbs of the object 150 are not occluded and the others of limbs of the object 150 are occluded. Then, the computing module 220 may perform the association operation and the prediction operation for depth image according to the joint positions recorded in the depth feature information to determine the joint positions of the object 150 in the depth image and obtain the first joint positions of the object 150.

In addition, when the global image includes an image in which the limbs of the object 150 are not occluded, the computing module 220 may obtain the color feature information corresponding to the global image (i.e., the image in which the limbs of the object 150 are not occluded) from the database 230. That is, the computing module 220 obtains the color feature information of the training sample that is most similar to the global image. The color feature information above includes information related to limbs of the full body of the object 150 when the limbs of the full body of the object 150 are not occluded. Then, the computing module 220 performs the association operation and the prediction operation for the color feature information and the global image to determine the joint positions of the object 150 in the global image and obtain the second joint positions of the object 150.

When the global image includes an image in which some of limbs of the object 150 are not occluded and the others of limbs of the object 150 are occluded, the computing module 220 may obtain the color feature information corresponding to the global image (i.e., the image in which some of limbs of the object 150 are not occluded and the others of limbs of the object 150 are occluded) from the database 230. That is, the computing module 220 obtains the color feature information of the training sample that is most similar to the full image. The color feature information above includes information related to limbs of the full body of the object 150 when some of limbs of the object 150 are not occluded and the others of limbs of the object 150 are occluded. Then, the computing module 220 may perform the association operation and the prediction operation for global image according to the joint positions recorded in the color feature information to determine the joint positions of the object 150 in the global image and obtain the second joint positions of the object 150.

The computing module 220 projects the first joint positions and the second joint positions to a three-dimensional space, and performs a combination operation for the first joint positions and the second joint positions to generate a three-dimensional skeleton of the object 150.

For example, the computing module 220 may set the weight ratio according to the depth image and the global image. That is, the computing module 220 may set the weight ratio according to the probability of the predicted node position of the depth image and the global image. In the embodiment, the sum of the weights corresponding to the depth image and the global image is, for example, one. For example, in general, the computing module 220 sets the weights corresponding to the depth image and the global image to 0.5.

In addition, if light or color interfere with the second image-capturing module 210, the prediction probability of the global image is decreased. Then, the computing module 220 may reduce the weight corresponding to the global image, for example, to 0.3, and the computing module 220 may increase the weight corresponding to the depth image, for example, to 0.7 accordingly.

Furthermore, if interference with the global image makes the prediction probability of the global image unrecognizable, the computing module 220 may reduce the weight corresponding to the global image to zero and the computing module 220 may increase the weight corresponding to the depth image to one accordingly. That is, the motion tracking system 200 may generate a three-dimensional skeleton of the object 150 mainly based on the depth image, so as to avoid reducing the accuracy of the three-dimensional skeleton of the object 150.

Then, the computing module 220 may perform the combination operation for the first joint positions and the second joint positions according to the weight ratio to generate the three-dimensional skeleton of the object 150, such as "dot plus connection" shown in FIG. 1B.

For example, the computing module 220 may perform an iterative update operation for the first joint positions and the second joint positions according to formula (1). Then, the computing module 220 clusters the joint positions of the same part according to formula (2). Afterward, the computing module 220 connects the joint positions corresponding to the three-dimensional skeleton of the object 150 to generate the three-dimensional skeleton of the object 150. The formula (1) and the formula (2) are as follows:

$$\hat{v} = \hat{\varepsilon}\hat{v}^{Depth} + (1-\hat{\varepsilon})\hat{v}^{Color}, \quad (1)$$

$$\hat{v} = \tilde{v}_a + \theta \cdot \frac{(\hat{v} - \tilde{v}_a)}{\|\hat{v} - \tilde{v}_a\|_2}, \quad (2)$$

$\hat{v}$ is the joint position corresponding to the three-dimensional skeleton of the object 150. $\hat{v}^{Depth}$ is the first joint position corresponding to the depth image. $\hat{v}^{Color}$ is the second joint position corresponding to the global image. $\hat{\varepsilon}$ is the weight ratio. According to the setting of the limiting angle value $\theta$ of the formula, the computing module 220 may effectively cluster the designated joint positions $\tilde{v}_a$ of the same part within the range of the limiting angle value $\theta$. Therefore, the problem that the accuracy of the generated three-dimensional skeleton of the object 150 is degraded or distorted by clustering the parts other than the designated joint positions is avoided.

Figure 2B:
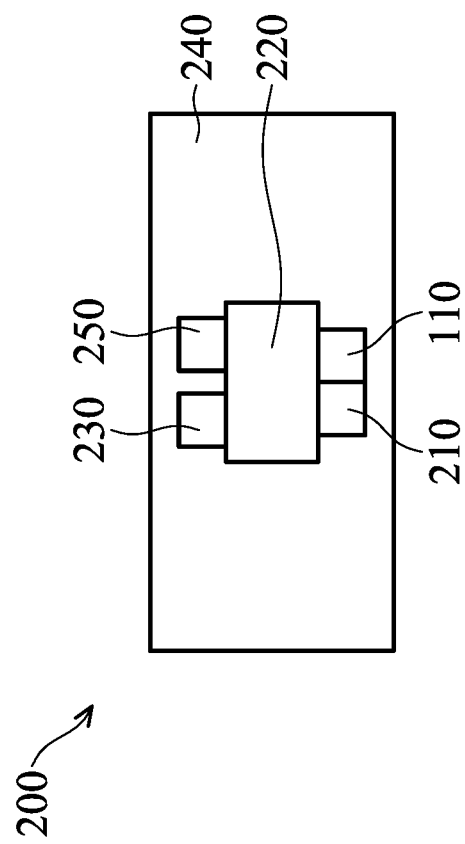
FIG. 2B is a schematic view of an arrangement relationship of a first image-capturing module, a second image-capturing module, a computing module and a head-mounted device in FIG. 2A.

In the embodiment, the motion tracking system 200 further includes a head-mounted device 240. and the first image-capturing module 110, the second image-capturing module 210 and the computing module 220 may be mounted on the head-mounted device 240, as shown in FIG. 2B. Therefore, the head-mounted device 240 may be mounted on the object 150 to sense the motions of the limbs of the object 150 and effectively generate the three-dimensional skeleton of the object 150.

In one embodiment, the first image-capturing module 110 and the second image-capturing module 210 may be mounted inside a case of the head-mounted device 240 to capture the full body motion of the object 150. The computing module 220 and the database 230 may be mounted inside the case of the head-mounted device 240 to compute the images obtained by the first image-capturing module 110 and the second image-capturing module 210.

In another embodiment, the first image-capturing module 110 and the second image-capturing module 210 may be mounted outside the case of the head-mounted device 240 to capture the object 150 and obtain the depth image and the global image corresponding the full body motion of the object 150. Furthermore, the first image-capturing module 110 and the second image-capturing module 210 may be mounted on a bottom, a center or a top outside the case of the head-mounted device 240.

In the embodiment, when the head-mounted device 240 is mounted on a head of the object 150, the first image-capturing module 110 and the second image-capturing module 210 have viewing angles of top-town view, so that a limb (such as the lower limb of the object 150) of the object 150 of the depth image in which is away from the first image-capturing module 110 and the second image-capturing module 210 is easily occluded by the arm of the object 150 to cause arm-leg self-occlusions. Since the three-dimensional skeleton corresponding to the limb of the object 150 that is occluded is already stored in the database 230, the computing module 220 is not affected by the depth image including the limb of the object 150 that is occluded.

When the depth image and the global image include the images in which some of limbs of the object 150 are not occluded and the others of limbs of the object 150 are occluded, the computing module 220 may still predict the joint positions of the limb of the object 150 occluded according to the depth feature information and the color feature information of the database 230, so that the computing module 220 may accurately generate the three-dimensional skeleton. That is, in the situation that the arm often occludes the body torso or lower limbs from the viewing angle of the head-mounted device 240, the computing module 220 may still predict the joint positions of the body torso or lower limbs to accurately generate the three-dimensional skeleton.

In addition, in the embodiment, the computing module 220 may take the head-mounted device 240 (i.e., the motion tracking system 200) as an origin point. The computing module 220 calculate a relative position and a relative direction of the limb of the object 150 to the head-mounted device 240 and a motion direction and an acceleration of the limb of the object 150 according to the depth image obtained by the first image-capturing module 110 and the global image obtained by the second image-capturing module 210. Then, the computing module 220 projects a virtual limb image corresponding to the object 150 to a virtual environment. The virtual limb (i.e., the three-dimensional skeleton) presented by the virtual environment is consistent with the real motion of the object 150.

Furthermore, since the viewing angles of the first image-capturing module 110 and the second image-capturing module 210 may be 180 degrees or 360 degrees, so that the limb of the object 150 is too close to the head-mounted device 240, the first image-capturing module 110 and the second image-capturing module 210 may still capture the full body motion of the object 150 from the head-mounted device 240. With the movement of the object 150 and the head-mounted device 240, the background environment is also constantly changing. According to the depth image and the global image corresponding to the object 150 obtained by the first image-capturing module 110 and the second image-capturing module 210, the motion tracking system 200 may effectively distinguish the motion of the object 150 and the background environment. Therefore, the motion tracking system 200 may accurately generate the three-dimensional skeleton and is not affected by a change in the background environment.

In addition, according to the depth image and the global image corresponding to the object 150 obtained by the first image-capturing module 110 and the second image-capturing module 210, the motion tracking system 200 may also effectively identify the limbs (such as the ankle and the foot) of the object 150. Therefore, the motion tracking system 200 may accurately generate a three-dimensional skeleton including the ankle and the foot. In the embodiment, the ankle and the foot are farther from the head-mounted device 240.

Furthermore, the motion tracking system 200 may include a measurement module 250. In the embodiment, the measurement module 250 may be an inertial measurement unit (IMU). The measurement module 250 is connected to the computing module 220, and measures and calculates the position, the motion direction and the motion speed of the head of the object 150 to generate a head posture. Then, the computing module 220 further associates the head posture, the first joint positions and the second joint positions according to the head posture, and projects the first joint positions, the second joint positions and the head posture to the three-dimensional space to generate the three-dimensional skeleton of the object 150. That is, the three-dimensional skeleton generated by the computing module 220 includes the limbs (such as the hand, the foot, etc.) of the object 150 and also includes the head of the object 150. In addition, the measurement module 250 may be mounted inside the case of the head-mounted device 240.

Figure 3:
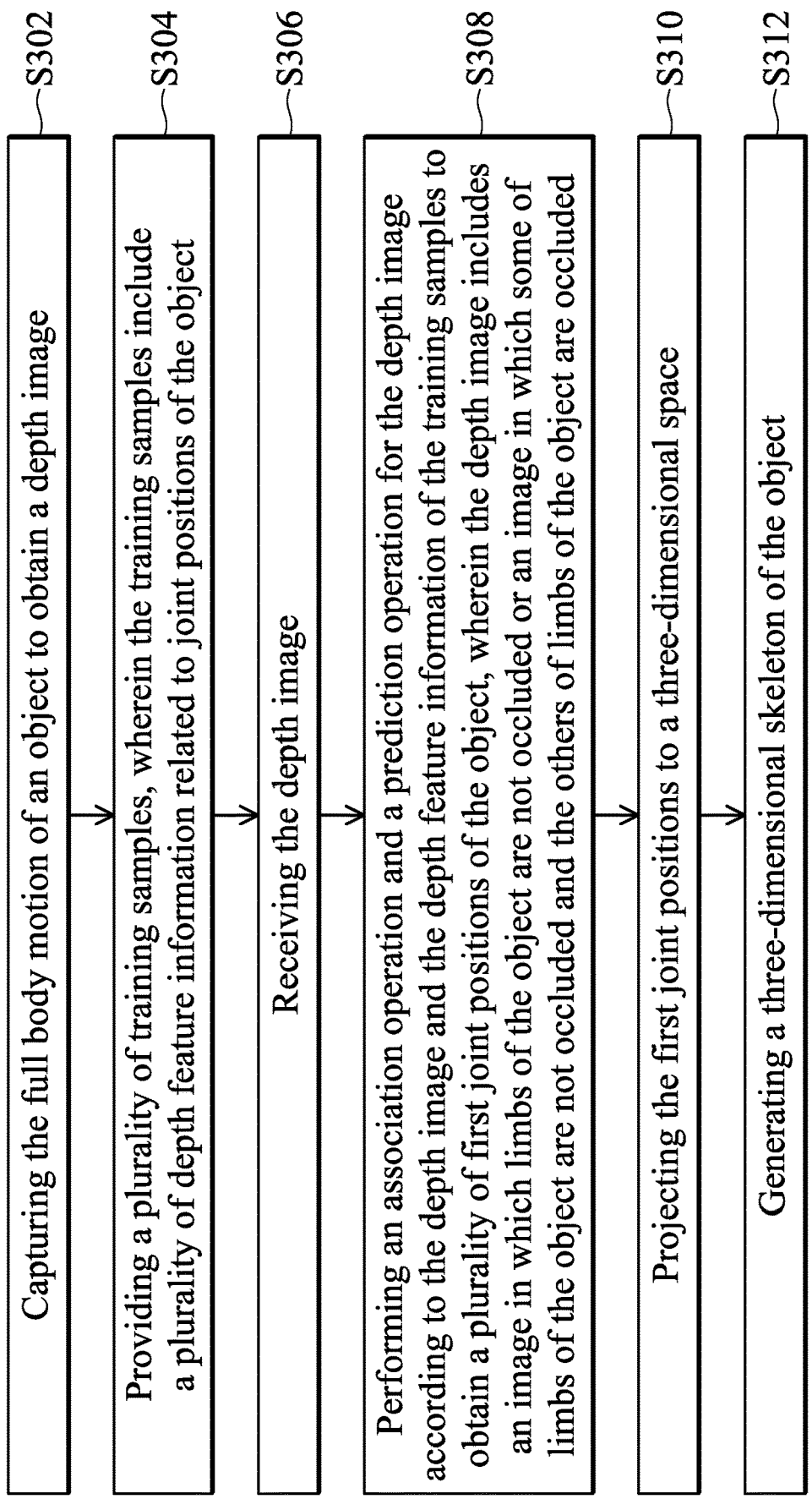
FIG. 3 is a flowchart of a motion tracking method according to an embodiment of the present disclosure.

According to the above-mentioned description, the embodiments described above may introduce a motion tracking method. FIG. 3 is a flowchart of a motion tracking method according to an embodiment of the present disclosure.

In step S302, the method involves capturing the full body motion of an object to obtain a depth image. In step S304, the method involves providing a plurality of training samples, wherein the training samples include a plurality of depth feature information related to joint positions of the object. In step S306, the method involves receiving the depth image. In step S308, the method involves performing an association operation and a prediction operation for the depth image according to the depth image and the depth feature information of the training samples to obtain a plurality of first joint positions of the object, wherein the depth image includes an image in which limbs of the object are not occluded or an image in which some of limbs of the object are not occluded and the others of limbs of the object are occluded.

In step S310, the method involves projecting the first joint positions to a three-dimensional space. In step S312, the method involves generating a three-dimensional skeleton of the object. In the embodiment, the step S302 is performed by a depth camera, and the depth camera may also be a wide-angle depth camera.

Figure 4A:
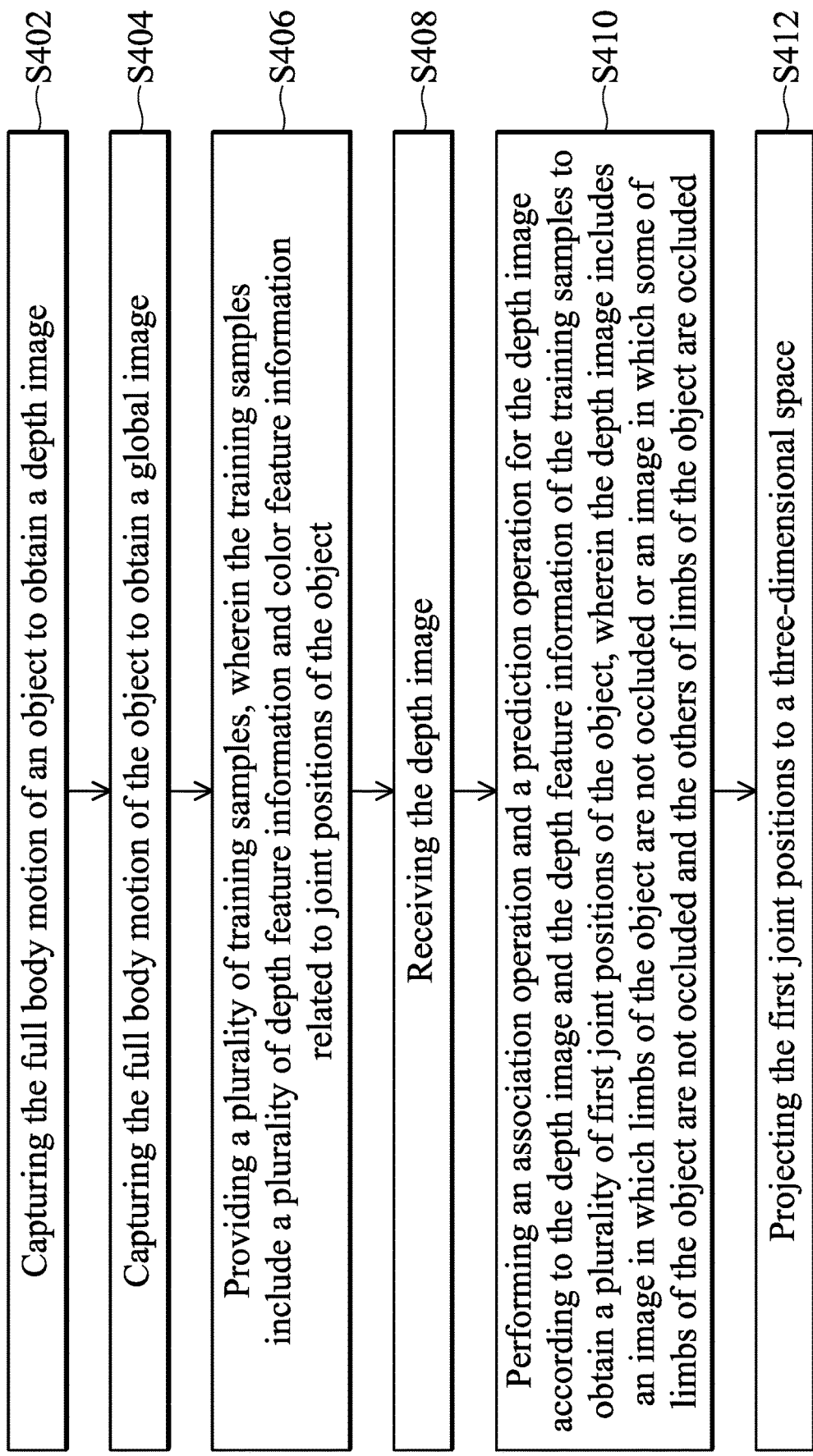
FIGS. 4A and 4B are a flowchart of a motion tracking method according to another embodiment of the present disclosure.
Figure 4B:
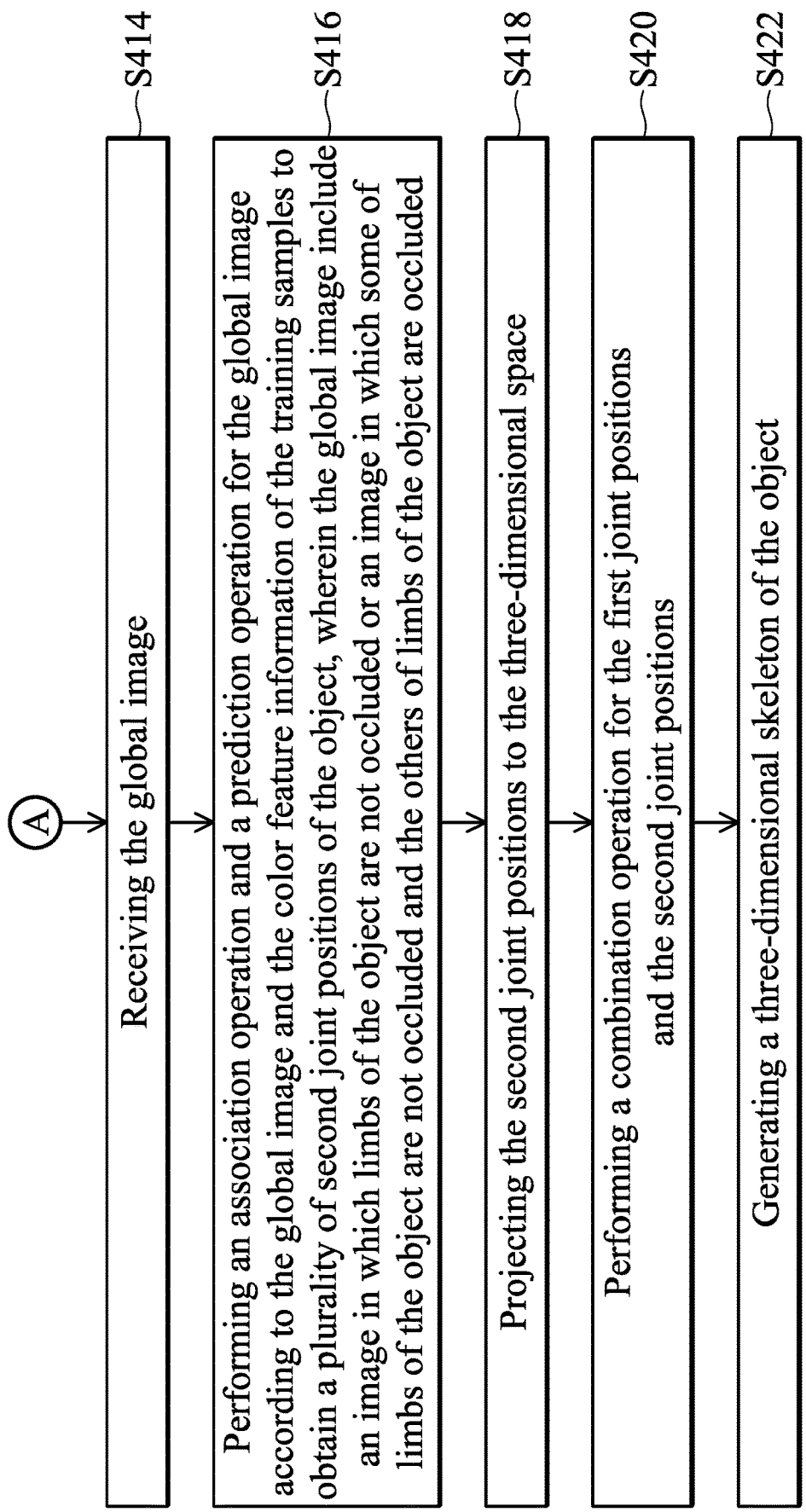

FIGS. 4A and 4B are a flowchart of a motion tracking method according to another embodiment of the present disclosure. In step S402, the method involves capturing the full body motion of an object to obtain a depth image. In step S404, the method involves capturing the full body motion of the object to obtain a global image. In step S406, the method involves providing a plurality of training samples, wherein the training samples include a plurality of depth feature information and color feature information related to joint positions of the object.

In step S408, the method involves receiving the depth image. In step S410, the method involves performing an association operation and a prediction operation for the depth image according to the depth image and the depth feature information of the training samples to obtain a plurality of first joint positions of the object, wherein the depth image includes an image in which limbs of the object are not occluded or an image in which some of limbs of the object are not occluded and the others of limbs of the object are occluded. In step S412, the method involves projecting the first joint positions to a three-dimensional space.

In step S414, the method involves receiving the global image. In step S416, the method involves performing an association operation and a prediction operation for the global image according to the global image and the color feature information of the training samples to obtain a plurality of second joint positions of the object, wherein the global image include an image in which limbs of the object are not occluded or an image in which some of limbs of the object are not occluded and the others of limbs of the object are occluded. In step S418, the method involves projecting the second joint positions to the three-dimensional space.

In step S420, the method involves performing a combination operation for the first joint positions and the second joint positions. In step S422, the method involves generating a three-dimensional skeleton of the object. In the embodiment, the step S404 is performed by a color fisheye camera, a monochrome fisheye camera or an infrared fisheye camera. The viewing angle of the color fisheye camera, the monochrome fisheye camera or the infrared fisheye camera is 180 degrees or more. In addition, the step S402 is performed by a depth camera, and the depth camera may also be a wide-angle depth camera.

Figure 5:
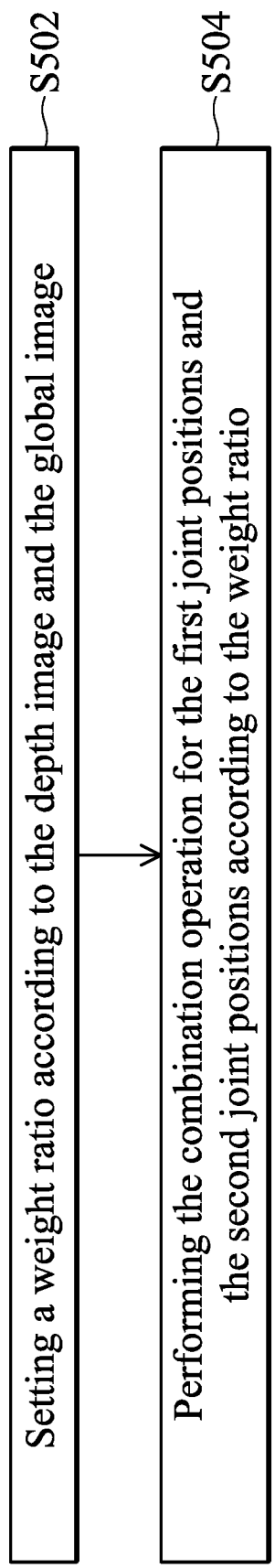
FIG. 5 is a detailed flowchart of the step S420 in FIG. 4B.

FIG. 5 is a detailed flowchart of the step S420 in FIG. 4B. In step S502, the method involves setting a weight ratio according to the depth image and the global image. In step S504, the method involves performing the combination operation for the first joint positions and the second joint positions according to the weight ratio.

Figure 6:
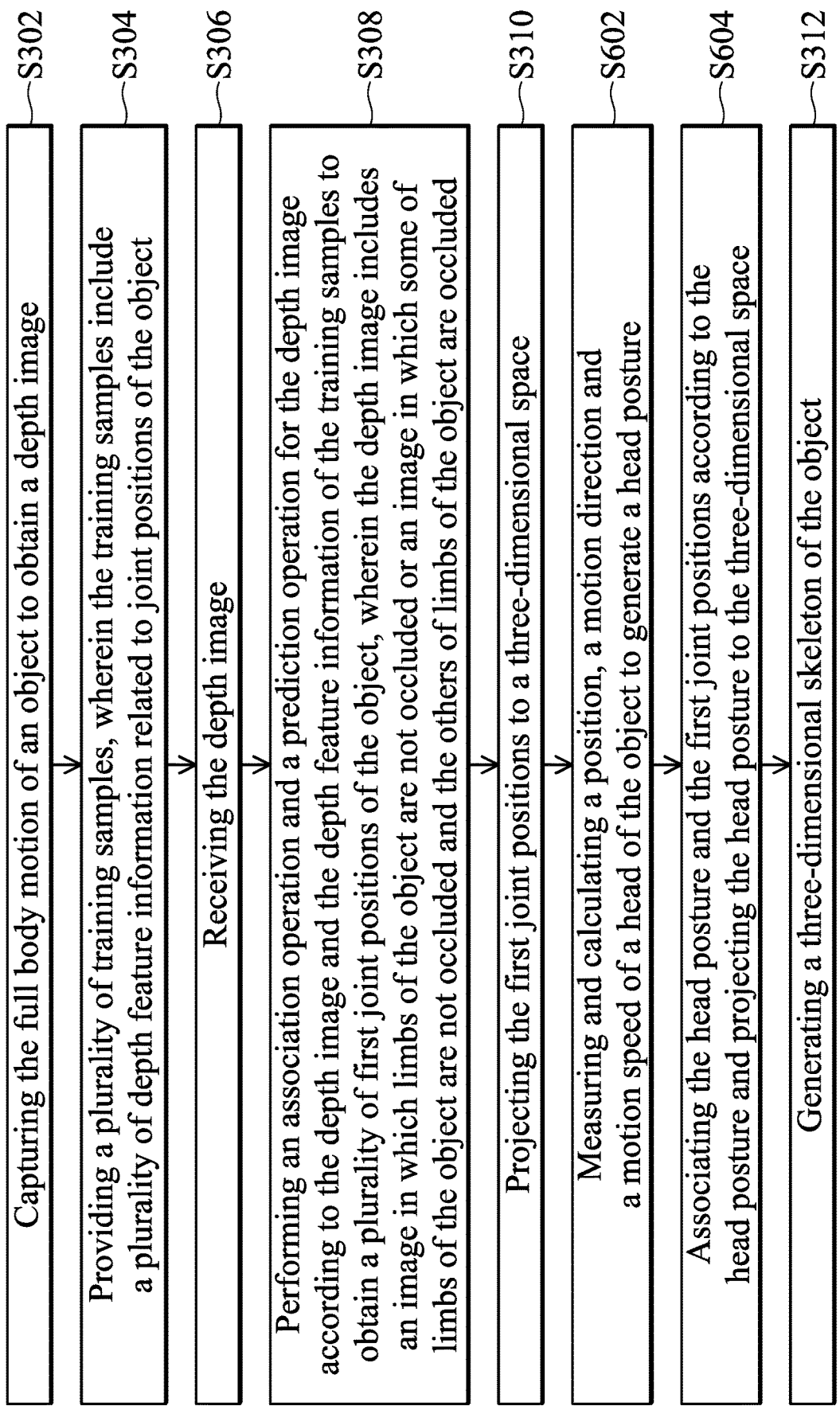
FIG. 6 is a flowchart of a motion tracking method according to another embodiment of the present disclosure.

FIG. 6 is a flowchart of a motion tracking method according to another embodiment of the present disclosure. The steps S302 to S310 of the embodiment are the same as that in FIG. 3, these steps may be described by the embodiment in FIG. 3, and the description thereof is not repeated here. In step S602, the method involves measuring and calculating a position, a motion direction and a motion speed of a head of the object to generate a head posture. In step S604, the method involves associating the head posture and the first joint positions according to the head posture and projecting the head posture to the three-dimensional space. In step S312, the method involves generating a three-dimensional skeleton of the object.

It should be noted that the order of the steps of FIG. 3, FIG. 4A, FIG. 4B, FIG. 5 and FIG. 6 is only for illustrative purpose, but not intended to limit the order of the steps of the present disclosure. The user may change the order of the steps above according the requirement thereof. The flowcharts described above may add additional steps or use fewer steps without departing from the spirit and scope of the present disclosure.

In summary, according to the motion tracking device and method, the first image-capturing module captures the full body motion of the object to obtain the depth image. The association operation and the prediction operation are performed for the depth image (including the image in which limbs of the object are not occluded or the image in which some of limbs of the object are not occluded and the others of limbs of the object are occluded) according to the depth image and the depth feature information of the training samples to obtain the first joint positions of the object. The first joint positions are projected to the three-dimensional space to generate the three-dimensional skeleton of the object. Therefore, the three-dimensional skeleton may be accurately obtained to track the full body motions of the object 150 and increase the convenience of use.

In addition, the embodiment of the present disclosure further obtains the global image by capturing the full body motion of the object through the second image-capturing module. The association operation and the prediction operation are further performed for the global image (including the image in which limbs of the object are not occluded or the image in which some of limbs of the object are not occluded and the others of limbs of the object are occluded) according to the global image and the color feature information of the training samples to obtain the second joint positions of the object. The second joint positions are projected to the three-dimensional space and the combination operation for the first joint positions and the second joint positions to generate the three-dimensional skeleton of the object. Therefore, the fineness of the obtained three-dimensional skeleton of the object is also increased, so as to track the full body motion of the object more effectively.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A motion tracking system, comprising:
a first image-capturing module, mounted on an object, and capturing a full body motion of the object to obtain a depth image;
a database, providing a plurality of training samples, wherein the training samples comprise a plurality of depth feature information related to joint positions of the object; and
a computing module, receiving the depth image, performing an association operation and a prediction operation for the depth image according to the depth image and the depth feature information of the training samples to obtain a plurality of first joint positions of the object, and projecting the first joint positions to a three-dimensional space to generate a three-dimensional skeleton of the object, wherein the depth image comprises an image in which limbs of the object are not occluded or an image in which some of limbs of the object are not occluded and the others of limbs of the object are occluded.

2. The motion tracking system as claimed in claim 1, further comprising:
a second image-capturing module, capturing the full body motion of the object to obtain a global image;
wherein the training samples further comprise a plurality of color feature information related to joint positions of the object;
wherein the computing module further receives the global image, performs an association operation and a prediction operation for the global image according to the global image and the color feature information of the training samples to obtain a plurality of second joint positions of the object, projects the second joint positions to the three-dimensional space, and performs a combination operation for the first joint positions and the second joint positions to generate the three-dimensional skeleton of the object, wherein the global image comprises an image in which limbs of the object are not occluded or an image in which some of limbs of the object are not occluded and the others of limbs of the object are occluded.

3. The motion tracking system as claimed in claim 2, wherein the computing module further sets a weight ratio according to the depth image and the global image, and performs the combination operation for the first joint positions and the second joint positions according to the weight ratio to generate the three-dimensional skeleton of the object.

4. The motion tracking system as claimed in claim 2, wherein the second image-capturing module is a color fisheye camera, a monochrome fisheye camera or an infrared fisheye camera.

5. The motion tracking system as claimed in claim 2, further comprising a head-mounted device, wherein the first image-capturing module, the second image-capturing module and the computing module are disposed on the head-mounted device.

6. The motion tracking system as claimed in claim 2, wherein a viewing angle of the second image-capturing module is 180 degrees or more.

7. The motion tracking system as claimed in claim 1, wherein the first image-capturing module is a depth camera.

8. The motion tracking system as claimed in claim 1, further comprising a head-mounted device, wherein the first image-capturing module and the computing module are disposed on the head-mounted device.

9. The motion tracking system as claimed in claim 8, wherein the computing module takes the head-mounted device as an origin point, and calculates a relative position and a relative direction of the limb of the object to the head-mounted device and a motion direction and an acceleration of the limb of the object according to the depth image to project a virtual limb image corresponding to the object to a virtual environment.

10. The motion tracking system as claimed in claim 1, further comprising:
   a measurement module, connected to the computing module, measuring and calculating a position, a motion direction and a motion speed of a head of the object to generate a head posture;
   wherein the computing module further associates the head posture and the first joint positions according to the head posture, and projects the first joint positions and the head posture to the three-dimensional space to generate the three-dimensional skeleton of the object.

11. The motion tracking system as claimed in claim 1, wherein the three-dimensional skeleton of the object comprises a finger skeleton of the object.

12. A motion tracking method, comprising:
   using a first image-capturing module to capture a full body motion of an object to obtain a depth image, wherein the first image-capturing module is mounted on the object;
   providing a plurality of training samples, wherein the training samples comprise a plurality of depth feature information related to joint positions of the object;
   receiving the depth image;
   performing an association operation and a prediction operation for the depth image according to the depth image and the depth feature information of the training samples to obtain a plurality of first joint positions of the object, wherein the depth image comprises an image in which limbs of the object are not occluded or an image in which some of limbs of the object are not occluded and the others of limbs of the object are occluded;
   projecting the first joint positions to a three-dimensional space; and
   generating a three-dimensional skeleton of the object.

13. The motion tracking method as claimed in claim 12, wherein the training samples further comprise a plurality of color feature information related to joint positions of the object, and the motion tracking method further comprises:
   capturing the full body motion of the object to obtain a global image;
   receiving the global image;
   performing an association operation and a prediction operation for the global image according to the global image and the color feature information of the training samples to obtain a plurality of second joint positions of the object, wherein the global image comprises an image in which limbs of the object are not occluded or an image in which some of limbs of the object are not occluded and the others of limbs of the object are occluded;
   projecting the second joint positions to the three-dimensional space;
   performing a combination operation for the first joint positions and the second joint positions.

14. The motion tracking method as claimed in claim 13, wherein the step of performing the combination operation for the first joint positions and the second joint positions comprises:
   setting a weight ratio according to the depth image and the global image; and
   performing the combination operation for the first joint positions and the second joint positions according to the weight ratio.

15. The motion tracking method as claimed in claim 13, wherein the full body motion of the object is captured by a color fisheye camera, a monochrome fisheye camera or an infrared fisheye camera to obtain the global image.

16. The motion tracking method as claimed in claim 15, wherein a viewing angle of the color fisheye camera, the monochrome fisheye camera or the infrared fisheye camera is 180 degrees or more.

17. The motion tracking method as claimed in claim 12, wherein the first image-capturing module is a depth camera.

18. The motion tracking method as claimed in claim 12, wherein the three-dimensional skeleton of the object comprises a finger skeleton of the object.

19. The motion tracking method as claimed in claim 12, further comprising:
   measuring and calculating a position, a motion direction and a motion speed of a head of the object to generate a head posture; and
   associating the head posture and the first joint positions according to the head posture and projecting the head posture to the three-dimensional space.

20. A non-transitory computer readable medium storing a program causing a processor to execute a motion tracking method, wherein the motion tracking method comprises:
   using a first image-capturing module to capture a full body motion of an object to obtain a depth image, wherein the first image-capturing module is mounted on the object;
   providing a plurality of training samples, wherein the training samples comprise a plurality of depth feature information related to joint positions of the object; and
   receiving the depth image, and performing an association operation and a prediction operation for the depth image according to the depth image and the depth feature information of the training samples to obtain a plurality of first joint positions of the object, wherein the depth image comprises an image in which limbs of the object are not occluded or an image in which some of limbs of the object are not occluded and the others of limbs of the object are occluded.

* * * * *